Dec. 9, 1924.

W. N. GREENE

BURGLAR ALARM

Filed Jan. 22, 1924

Inventor
Wiley Nathaniel Greene.

By
Morrill
Attorney

Dec. 9, 1924. 1,518,915
W. N. GREENE
BURGLAR ALARM
Filed Jan. 22, 1924 10 Sheets-Sheet 4

Dec. 9, 1924. 1,518,915
W. N. GREENE
BURGLAR ALARM
Filed Jan. 22, 1924 10 Sheets-Sheet 5

Inventor
Wiley Nathaniel Greene.
By
Attorney

Dec. 9, 1924.
W. N. GREENE
BURGLAR ALARM
Filed Jan. 22, 1924

Inventor
Wiley Nathaniel Greene.
By
Attorney

Dec. 9, 1924.

W. N. GREENE

BURGLAR ALARM

Filed Jan. 22, 1924     10 Sheets-Sheet 8

1,518,915

Inventor
Wiley Nathaniel Greene.
By L. R. Morrill
Attorney

Dec. 9, 1924.  
W. N. GREENE  
BURGLAR ALARM  
Filed Jan. 22, 1924   10 Sheets-Sheet 10

Inventor  
Wiley Nathaniel Greene.  
By  
L. R. Morrill  
Attorney

Patented Dec. 9, 1924.

1,518,915

UNITED STATES PATENT OFFICE.

WILEY NATHANIEL GREENE, OF GRAY, GEORGIA.

BURGLAR ALARM.

Application filed January 22, 1924. Serial No. 687,739.

*To all whom it may concern:*

Be it known that I, WILEY NATHANIEL GREENE, a citizen of the United States, residing at Gray, in the county of Jones and State of Georgia, have invented certain new and useful Improvements in Burglar Alarms, of which the following is a specification.

This invention relates to burglar alarms and has for an object to provide an improved type of burglar alarm embodying both vibrating and detonating alarm members with improved means for actuating.

A further object of the invention is to provide a burglar alarm having means for detonating a cartridge or the like with means for sounding an alarm upon a bell or other vibrating body with a plurality of arms and associated parts which independently and as required operate a trigger to initiate the alarm action.

A further object of the invention is to provide improved means for visually disclosing a signal indicating the point of attack of the burglar.

A further object of the invention is to provide improved means which may be wholly contained within the building guarded or associated with out buildings, whereby an alarm is sounded in case of the severance of connecting cables or the like.

A further object of the invention is to provide improved means for connecting the controlling cables or actuating mechanisms with movable closures, such as doors, windows, or the like.

A further object of the invention is to provide improved means for associating cables which are controlled by relaxation whereby said cables may be controlled also by a pull.

A further object of the invention is to provide means whereby the burglar alarm may be attached to an automotive vehicle or the like to sound an alarm in case the vehicle is moved.

A further object of the invention is to provide improved means for covering an opening such, for instance, as a window which, if moved or broken by a burglar, will cause an alarm.

A further object of the invention is to provide improved means for mounting the alarm upon buildings at times not occupied with tubes or barrels extending through the walls of the building whereby a series of detonations may be produced to be discharged and heard upon the exterior of the building.

A further object of the invention is to provide improved means for actuating the device by compressed fluid, such for instance as compressed air.

A further object of the invention is to provide means whereby a series of burglar alarm units may be coupled together to produce a series of intermittent alarms.

A further object of the invention is to provide means for coupling together a plurality of burglar alarm units whereby a single detonation and alarm may be sounded from an increased number of stations.

A further object of the invention is to provide improved means for attaching a burglar alarm of the type temporarily to or adjacent to a door or the like for temporarily sounding alarm in case of entry of said door.

With these and other objects in view, the invention comprises certain novel parts, elements, units, combinations, constructions, mechanical movements and functions as disclosed in the drawings together with mechanical and functional equivalents thereof, as will be hereinafter more fully described and claimed.

In the drawings.

Like characters of reference indicate corresponding parts throughout the several views.

The improved burglar alarm which forms the subject matter of this application is adapted to be varied slightly in accordance with the position of use and manner of installation, but in general comprises a frame composed of spaced and substantially parallel side bars 50 connected by a plurality of spacing rods 51, 52, 53, 54 and 55. The rods 51 and 55 serve to clamp the side bars 50 upon the upwardly extending arms of U-shaped members 56 and 57. The arms 57 extend upwardly above the side bars 50 and are again preferably connected by a spacing rod 58.

Mounted upon the spacing rod 58 as a fulcrum are a plurality of bell crank levers 59, 60 and 61 which are respectively provided with hooks 62, 63 and 64 engaged respectively by chains or cables represented diagrammatically at 65, 66 and 67, it being understood that representing these devices as chains is only a convenient means of showing and in no way limits the invention. The connections 65, 66 and 67 respectively connect with cables 68, 69 and 70 which extend to openings or buildings to be protected by the burglar alarm. A great variety of connections may be employed for such purposes as will be more fully understood as the description of the invention develops.

Preferably, there are interposed between the chains and the cables springs 71, 72 and 73 so that, when the device is not in use as, for instance, during the day time, the chains may be transferred respectively from their hooks 62, 63 or 64 to stationary hooks 74, 75 and 76, as indicated in dotted lines at 65′ and 66′.

As shown and described, three of the levers 59, 60 and 61 and their associated parts are disclosed. It is to be understood that the invention is in no way limited to this number and the number may be more or less as occasion may make necessary or desirable and the showing throughout the drawings of more or less under any circumstance or condition is not intended as any variation of the invention as the invention includes any number of such levers and accessories as may be determined upon.

The several levers 59, 60 and 61 are respectively pivotally connected with plungers 74, 75 and 76, such plungers riding upon a bail 77, keepers or clips 78, 79 and 80 being rigidly attached to said plungers for the purpose of maintaining said plungers in proper relation with the bail. These keepers also are employed if and when found desirable to carry annunciator plates 81, 82 and 83 which carry numerals or other proper designating characters, preferably radio active which, when properly displayed through a housing covering the device not shown, will indicate which one of the levers has been actuated by the cable.

The bail 77 is pivoted, as will be noted, upon the rod 54 and is provided at one end with an extension lever 84 which is connected by means of a pivoted link 85 with a trigger 86 fulcrumed upon the rod 55.

Figures 18, 23, 24:
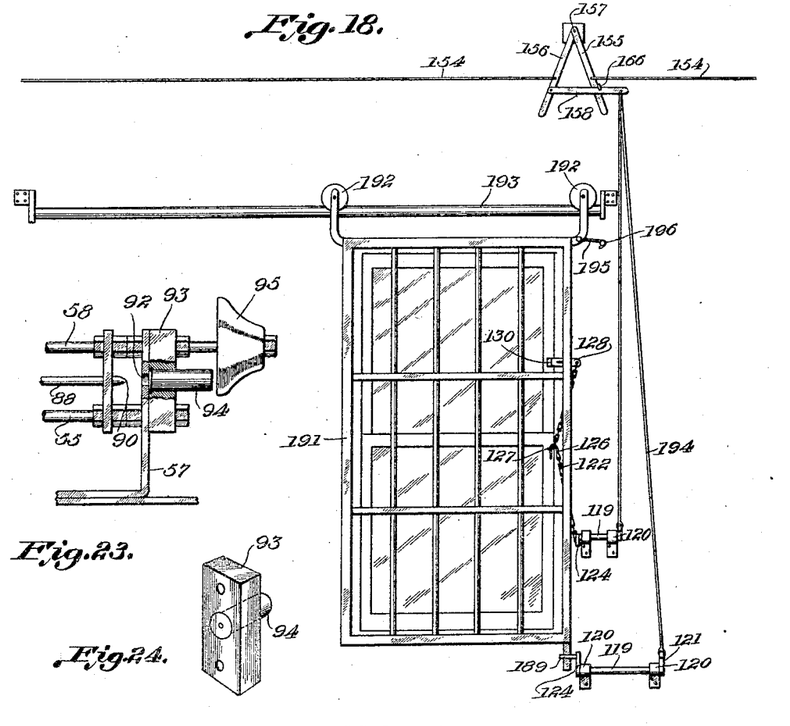
Fig. 18 is a view in elevation of a grid for covering a window showing the attachment with the alarm cable of the window itself and the grid.
Fig. 23 is a view in elevation broken away showing means for employing a cartridge of the type ordinarily known as a shot gun shell in place of the cartridge to which the unit is ordinarily directed.
Fig. 24 is a view of the auxiliary shell supporting block shown in elevation and section at Figure 23.

Carried also by the rods 55 and 58 are guides 87 properly spaced and rigidified by lock nuts or other well known mechanical means and provided with aligned openings for the proper sliding action of the firing pin 88 which is provided with a spring 89 which, when the firing pin is released, forces the point 90 into engagement with the percussion element of a cartridge 91 which is normally inserted through the opening 92 in the arm 57. As shown at Figure 23, this may be varied by employing a separate block 93 rigidly secured to the arm 57 having an opening in alignment with the perforation 92 for carrying a larger cartridge or shell 94. In any case, a protector 95 is employed simply to protect walls, furniture or the like from the action of the detonated charge. This protector is carried in any approved manner, as for instance upon the rod 58. The firing pin 88 is provided with a detent 96, properly proportioned so that, when the firing pin is turned, the detent 96 will engage upon the nut 97 to be thereby maintained in inactive position until forced out of such engagement by the finger 98 of the trigger 86, which responds to each movement of any of the plungers 74, 75 or 76 acting upon the bail 77 through the link 85. It follows, therefore, that, when the bail 77 is moved by the movement of any of the plungers through the action of any of the bell crank levers, the detent 96 of the firing pin is dislodged from its support upon the nut 97 and under the action of the spring 89 detonates the cartridge.

For the purpose of properly limiting the throw or movement of the several levers 59, 60 and 61, a rod 99 is properly positioned to be engaged by said levers at their upward throw, the lower limit of movement being defined by the rod 52. Guides for the levers, indicated by the plates 100, are also employed, the rod 99 being properly braced and maintained rigid by the braces 101.

Figure 1:
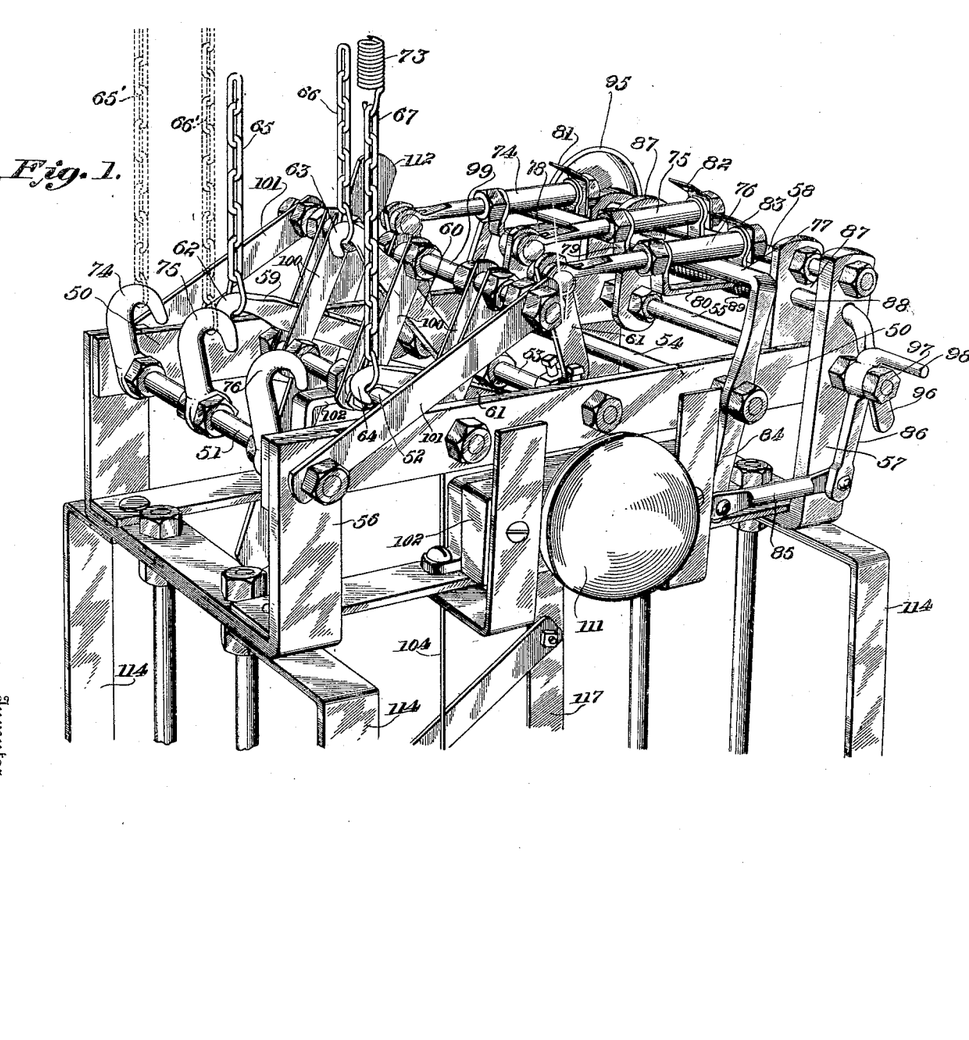
Fig. 1 is a perspective view of a complete burglar alarm unit, seen substantially from the side.
Figure 2:
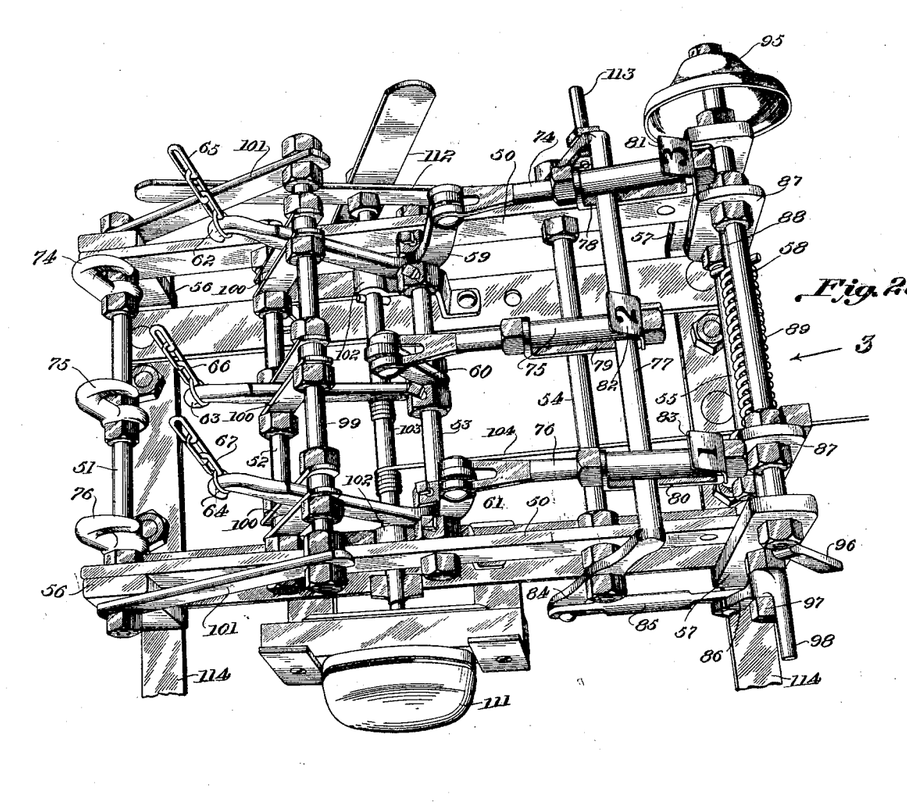
Fig. 2 is a perspective view of the burglar alarm unit seen substantially from above.
Figures 3, 4, 40:
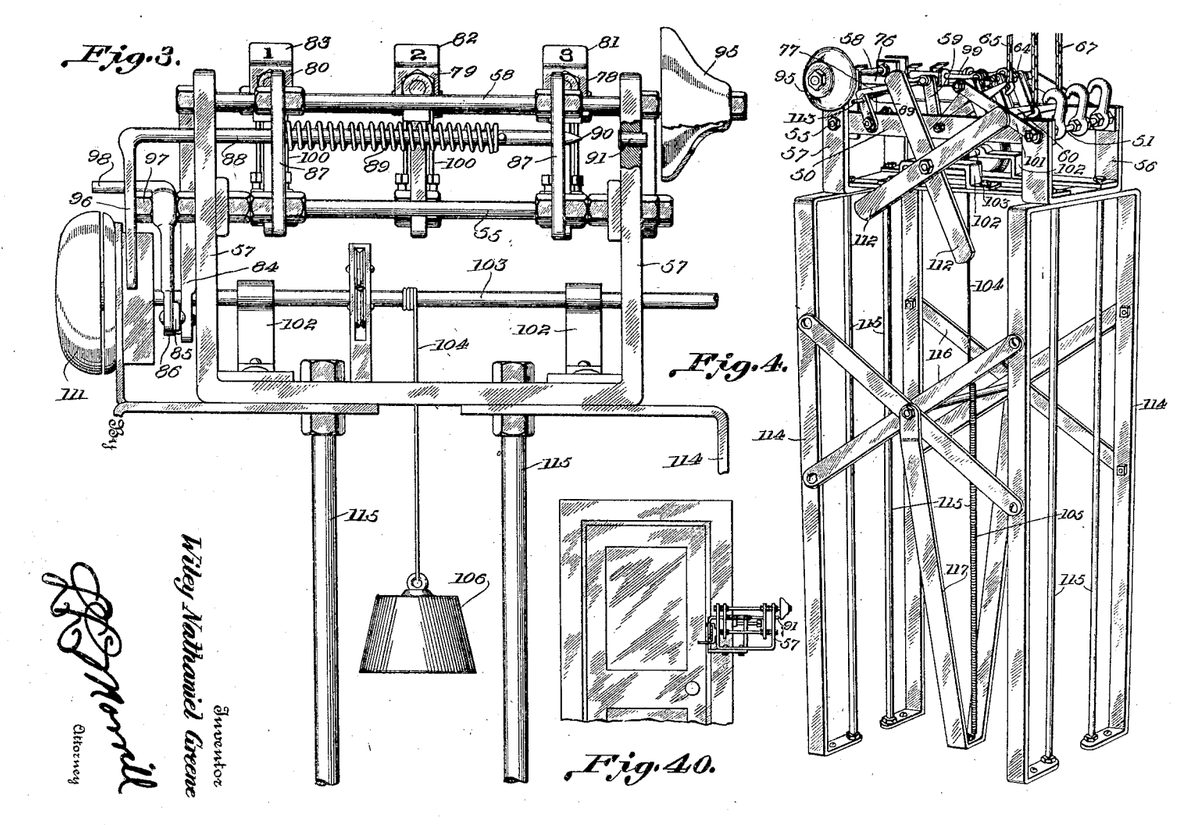
Fig. 3 is a view in end elevation of the burglar alarm unit seen from the end indicated by the arrow 3 at Fig. 2.
Fig. 4 is a perspective view of the burglar alarm unit seen from the side opposite Fig. 1 and shown upon a supporting stand guyed to the floor.
Fig. 40 (Sheet 3) is a view in elevation of a temporary means for attaching a unit to a door casing for temporary protection against the opening of the door.
Figures 5, 6, 30:
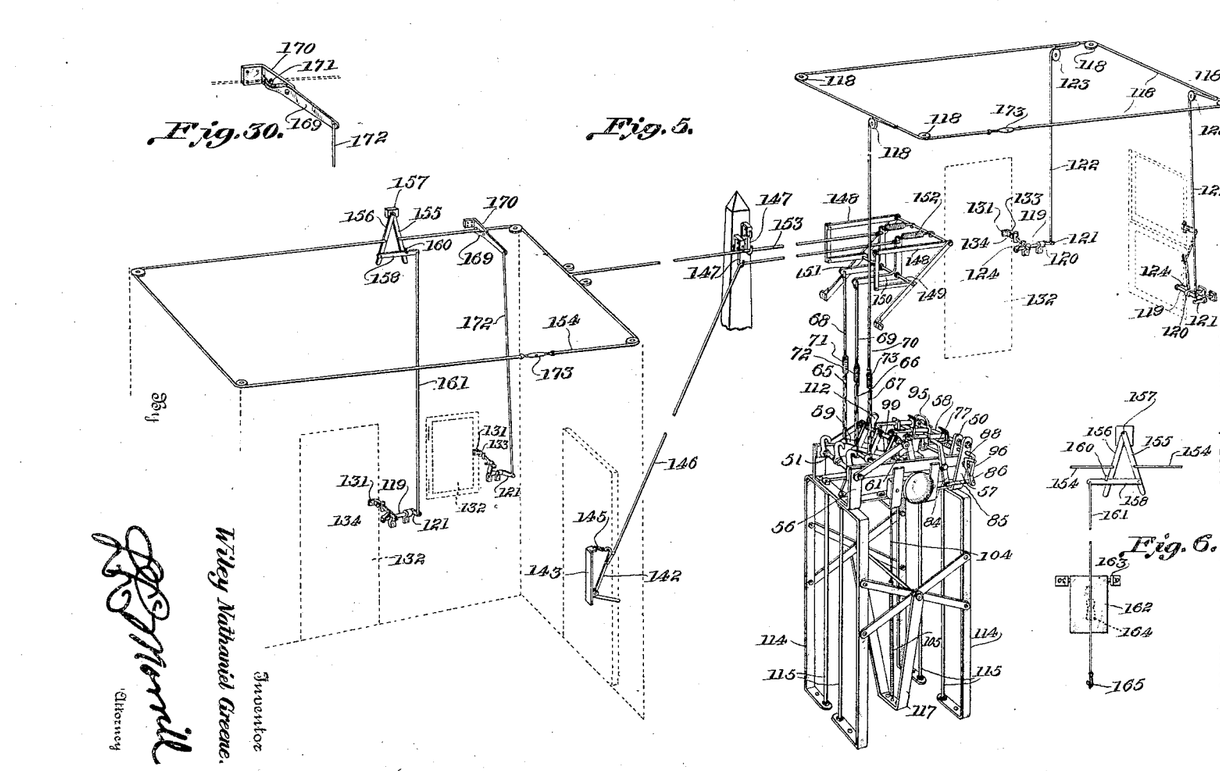
Fig. 5 is a perspective view, largely diagrammatic, of a means for attaching a burglar alarm unit to a plurality of out buildings and a plurality of closures in said several out buildings.
Fig. 6 is a view in elevation of a means for connecting the burglar alarm with a cover made for a key hole to operate when a key is inserted in the key hole.
Fig. 30 (Sheet 4) is a perspective view of a means for severing the tensioned cable by a pull upon a cable controlled from a closure.
Figures 16, 29:
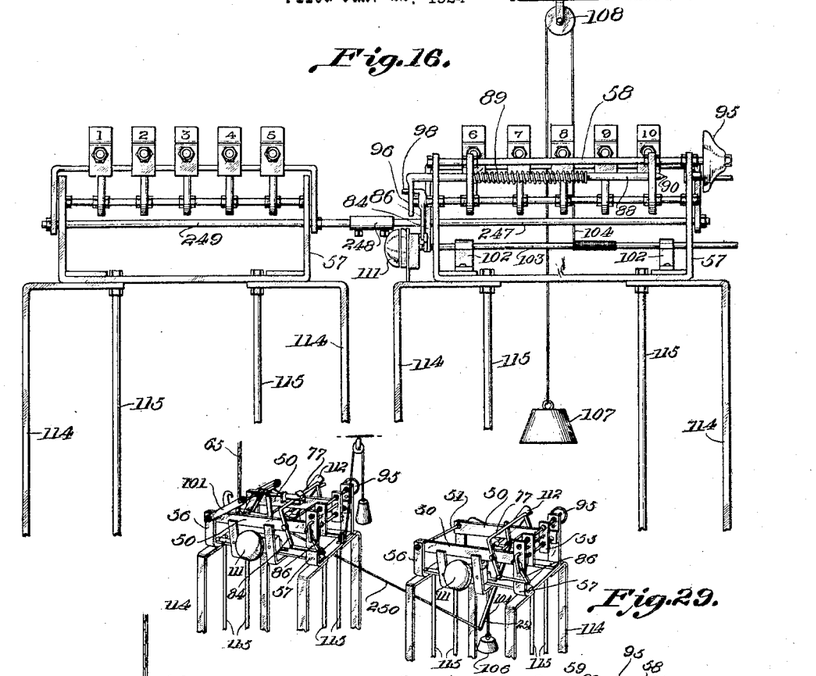
Fig. 16 is a view in end elevation of an alarm unit and a connected controlling unit.
Fig. 29 (Sheet 6) is a perspective view of a means of coupling a plurality of detonating units whereby the interval between detonations is increased over that type of coupling shown at Figure 17.
Figure 17:
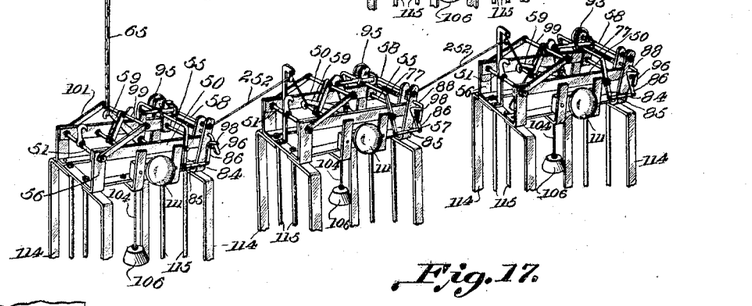
Fig. 17 is a perspective view of a plurality of alarm units connected in series whereby a series of detonations and alarms will be produced.
Figures 37, 38:
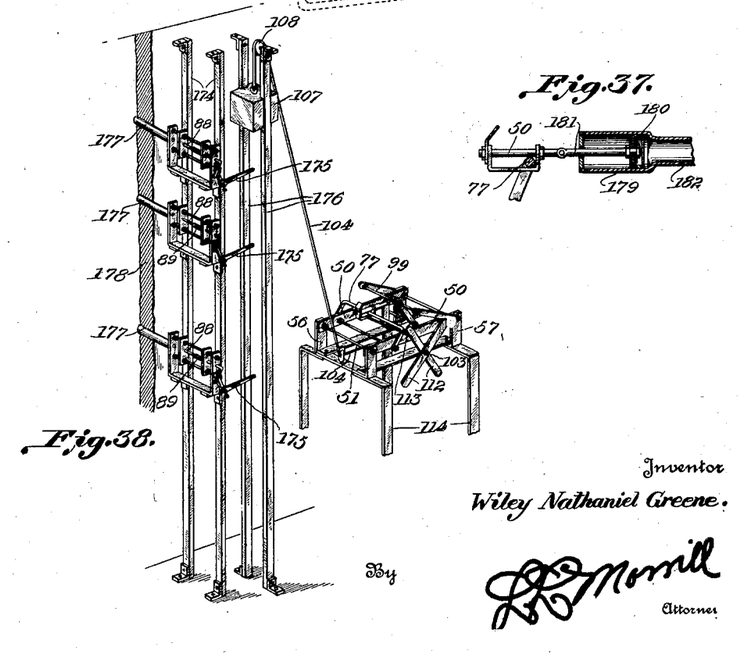
Fig. 37 is a sectional view of the piston and trigger for compressed air actuation.
Fig. 38 is a perspective view of a type of device which operates periodically a series of detonations which are discharged through tubes or barrels extending through the side of the building.

Journaled also in bearings 102 is a shaft 103 subjected to a rotating stress, preferably applied thereto by means of a cord or cable 104 placed under tension in any usual and ordinary manner as, for instance, by the spring 105, as shown at Figures 4 and 5, or by a weight 106 attached directly to said cable as shown at Figures 3, 8, 17 and 29, or a weight 107 connected to the cable 104 after passing over a pulley 108, as shown at Figures 16 and 38, or connected to other units as indicated by the cable 109, as shown at Figure 17, or 110 as shown at Figure 29 (Sheet 6).

This rotating shaft 103 is provided with any usual and ordinary attachment for ringing the bell 111 when the shaft is rotated. No particular novelty is claimed for such mechanical means and any well known device for the purpose may be employed. At the end opposite the bell, the shaft 103 is provided with a plurality of radially extending arms 112, here shown as four in number but it is to be understood that any greater or less number may be employed with equal or like effect. The bail 77 carries a finger 113, properly arranged to be engaged by one of the arms 112 when the bail is in inoperative position whereby the shaft 103 is held against rotation. When, however, the bail is moved forwardly by any one of the plungers 74, 75 or 76, the finger 113 is moved out of engagement with the arms 112 and the shaft 103 rotated by the stress applied thereto by the cable 104 ringing the bell.

A complete alarm unit will, therefore, contain the mechanism hereinbefore described comprising the sounding alarm and the detonating alarm. In ordinary installation, this will be mounted upon a supporting structure represented by the legs 114 attached and guyed to the floor by the guy rods 115, properly braced and strengthened as indicated at 116. In the type employing the spring, a yoke 117 will be secured to the frame, as indicated at Figures 4 and 5, whereby the end of a long spring may be properly attached. In case of weight actuation, the yoke 117 may be omitted.

Figures 7, 8, 9, 10, 11, 12, 13, 14, 15, 22:
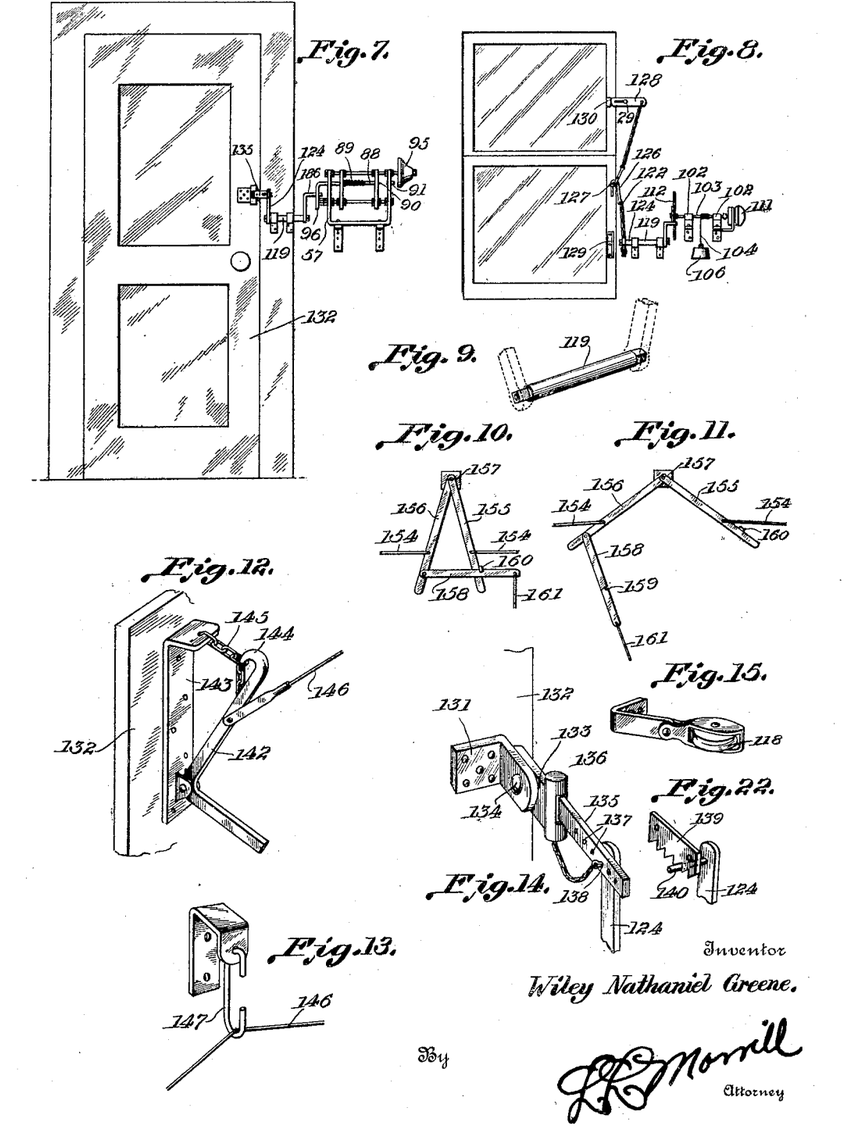
Fig. 7 is a view in elevation of a burglar alarm unit attached to the wall adjacent to a door to be operated directly from the opening of the door without the intervention of cables.
Fig. 8 is a view in elevation of a burglar alarm unit attached to the wall adjacent a window showing the means for connecting both sashes of the window with said alarm to actuate said alarm without the intervention of cables, other than those connected directly with the sash.
Fig. 9 is a perspective view of the connecting shaft showing the means of setting the levers on said shaft at various angles as installation may make necessary or desirable.
Figs. 10 and 11 are views in elevation, respectively closed and open, of a connecting member for a cable normally under tension to be released by a pull.
Fig. 12 is a perspective view of a connecting member for attachment to a door whereby tension upon the cable may be released at will.
Fig. 13 is a perspective view of a hanger for supporting the cable at a slight angle.
Fig. 14 is a perspective view of one type of member forming connection between a door and an adjacent alarm unit or a cable connection.
Fig. 15 is a perspective view of a shieve used for conducting the cable when an angle greater than that indicated at Figure 13 is found necessary or desirable.
Fig. 22 (Sheet 5) is a perspective view of a modification of the attaching means shown in the adjacent Figure 14.
Figure 26:
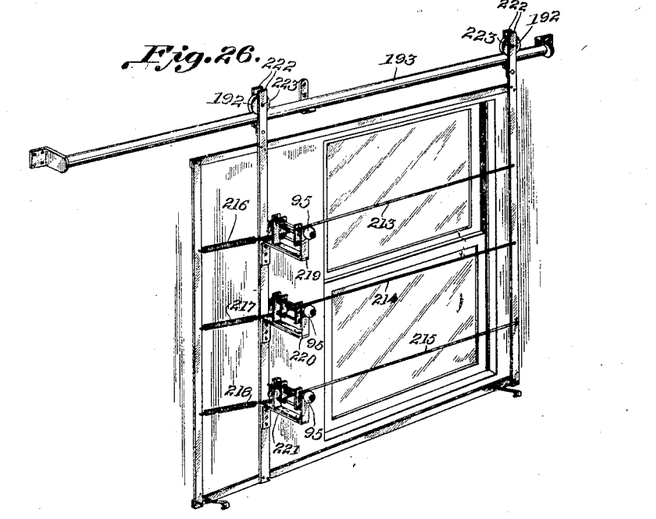
Fig. 26 is a perspective view of a plurality of modified alarm units attached directly to a frame which slides over a window opening, any one of said units producing a detonation by the severing of the connecting wire crossing the window opening.

At times and in certain positions, both the detonating and the sounding alarms are not found necessary, as for instance as shown at Figures 7 and 8, which discloses a simpler construction employed for local or temporary use. Also as shown at Figures 26 and 38, the detonating device may be employed in a plurality of numbers to be operated successively or as their connection may make necessary.

In the ordinary installation of the device, as for instance for the protection of an occupied residence, the cable 70 will run over the necessary pulleys 118, the position and arrangements of the pulleys depending upon the position of the unit and the relation of the closures to be connected therewith. For the purpose of connecting the several closures, a shaft 119 is properly mounted in bearings 120, the position of the shaft depending upon the type of closure to be protected. In any event, it is provided at one end with a lever 121 connected by means of a cord or cable 122 with means for rotating the shaft at the opening of the closure. These cords or cables 122 are connected directly with or, after passing over pulleys 123, to the cable 118, so that, when any of the cords or cables 122 are placed under stress by the opening of a closure, the cable 118 and connected cable 70 are likewise placed under stress, lifting the connected lever, in the case illustrated the lever 61 operating the bail and other devices as disclosed.

For connecting to the closure, a second lever 124 is connected to the shaft 119, preferably at an angle. This angular arrangement is accomplished in the manner shown at Figure 9 by employing multi-angular extremities upon the shaft 119 or by employing set screws as shown at 125 shown at Figure 25 (Sheet 7) or by any other usual and ordinary mechanical expedient. The lever 124 is actuated by a structure intervening between such lever and the opening member, as a door or a window. In the case of a window, the cable 122 may be provided with a hook 126 (see Figure 8, Sheet 5, or Figure 18, Sheet 7), such hook engaging a securing or similar member 127 in the lower sash. For the upper sash a lever 128 is pivoted as at 129 and connected at the end 130 with such upper sash, so that the lowering of the upper sash acts upon the hook 126 in the same manner as the raising of the lower sash. In this position, preferably a guard plate 129 will be mounted upon the sash to obstruct a hand which might be inserted through the window upon the breaking of the glass for disconnecting the parts.

Figures 31, 32, 33, 35:
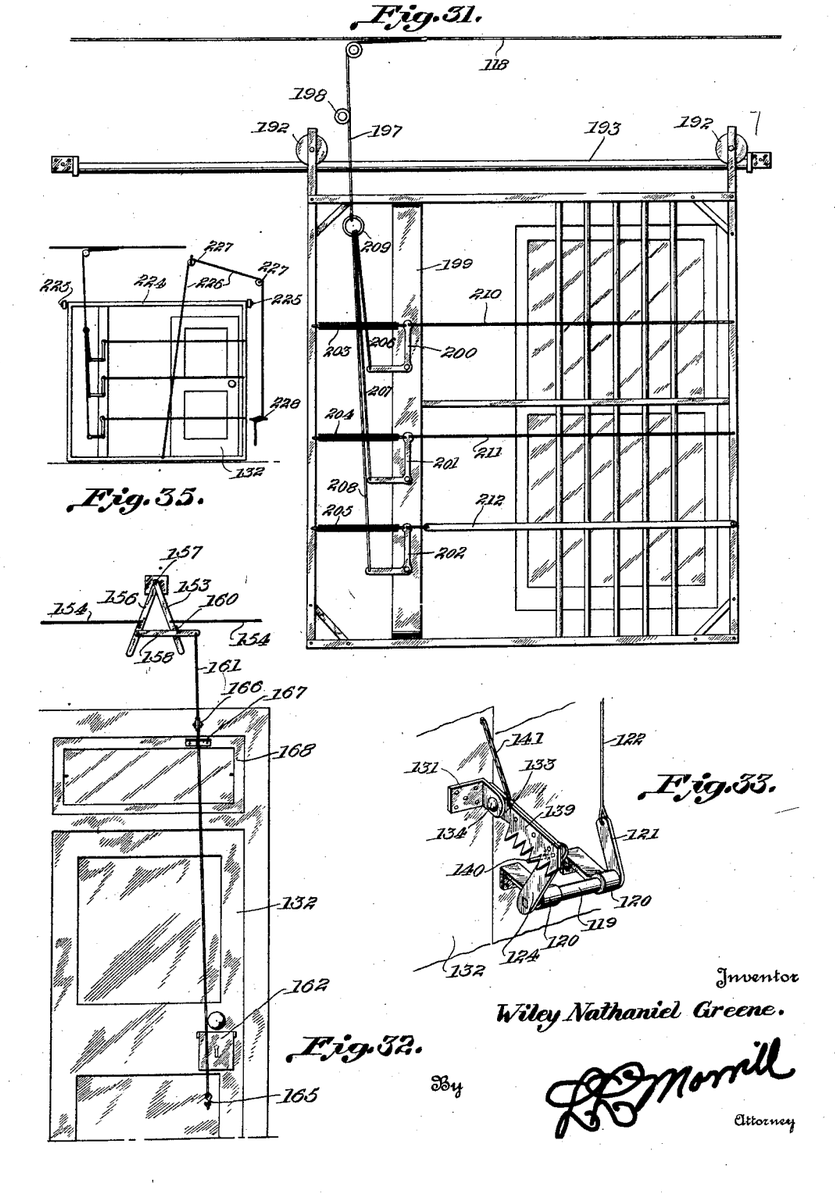
Fig. 31 is a view in elevation of a grid for covering an opening, as for instance a window or the like, with improved means for actuating a controlling cable when any of the wires or bars crossing the window are cut or disconnected.
Fig. 32 is an improved means for actuating the alarm when a key hole covering member or a transom is opened.
Fig. 33 is a perspective view of a modified type of connecting member for a door whereby the connecting pawl may be raised out of engaging position.
Fig. 35 is a view in elevation, somewhat diagrammatic, showing a window or door covering grid with means for raising it upon fulcrums out of operative position and out of the way.

The connection with the door has been shown as various forms at Figures 14 and 22, Sheet 5, and Figure 33, Sheet 9. It comprises a bracket 131 secured to the door 132 with an arm 133 pivoted thereto at 134. This arm 133 is provided with an extension. At Figure 14, this extension 135 is pivoted to the arm 133 at 136 and is provided with a plurality of spaced perforations 137 which, through the action of a cotter pin 138, connect directly with the lever 124. In case where it is desired to close the door after leaving the building, however, a plate 139 is riveted or otherwise secured to the lever 135, as shown at Figures 22 and 33, the saw teeth of this plate engaging a pin 140 carried by the lever 124. As shown at Figure 14, when the plate 139 is attached thereto, it may be moved laterally relative to the lever 124 and, as shown at Figure 33, may be raised and lowered, a chain or other limiting means 141 being affixed thereto and to the door.

A device also which will enable the user to conveniently connect and disconnect comprises a bell crank lever 142 (see Figure 12, Sheet 5) connected by means of a bracket 143 to the door 132 having a hook 144 engaging selectively with the links of a chain 145 carried by the bracket 143. To this a cable 146 is connected in the manner shown at Figure 5. This particular type of connection is designed more particularly for the protection of out-buildings and the cable 146 is carried through necessary hangers and supporters 147 and enters the building equipped with the alarm unit.

To prevent the defeating of the purpose by cutting the cable, a bracket 148 is supported within the residence or other building, having a shaft 149 upon which is fulcrumed a plurality of bell crank levers 150 and 151. As shown at Figure 5, two of these bell crank levers are disclosed but it is to be understood that the number may be more or less as occasion may make desirable. The cable 146 runs to the lever 150, and a spring 152 is employed to actuate the lever 150 when the tension on the cable 146 is released intentionally or being severed by an unauthorized person. The release of the cable 146 causes the spring 152 to put the cable 69 under tension to actuate its attached lever, in this particular case the lever 59.

The other bell crank lever here shown, 151, carries a cable 153 which passes over a similar hanger 147 and is connected to a cable 154 passing about within the out-building guarded. The release of the cable 154 will release the cable 153 and the bell crank lever 151 will operate in the same manner described in regard to the bell crank 150. For the purpose of releasing tension upon this cable, various means may be employed. At Figure 5, arms 155 and 156 are pivoted together at 157. This structure is shown in enlarged detail at Figures 10 and 11 (Sheet 5). A latch 158 is pivoted to one of the arms as 156 and is provided with a notch 159 which engages a pin 160 on the other arm so that, when the arms are drawn together and latched as shown at Figure 10, the cable 154 is under tension. When the latch is released, the arms separate, as shown at Figure 11, whereby the tension upon the cable 154 is released. To disengage this latch 158, a cable 161 runs to some release means. As shown at Figure 5, this releasing means is the shaft 119 and lever 121. At Figure 6 (Sheet 4), a plate 162 is fulcrumed at 163 over a key hole indicated in dotted lines at 164 and the cable 161 extends over this plate and is connected by a hook 165 with any convenient part of the building.

At Figure 32 (Sheet 9), a cable 161 runs first through a pulley 166 and is then engaged by a member 167 carried by a transom 168. At its lower end, it is connected over the plate 162 as described. Either or both installations may be employed separately or combined.

As a further means for releasing the tension upon the cable 154, a knife 169 (see Figures 5 and 30, Sheet 4) is fulcrumed upon a bracket 170. The bracket 170 is provided with a perforation 171 through which the cable 154 passes and a cable 172 extends to a lever 121 or any other means for exerting tension thereon when any closure is opened. The tensioning of the cable 172 will, therefore, sever the cable 154 whereby the tension on said cable is released to operate the device as disclosed. To keep the cables 118 and 154 under proper tension in view of varying climatic conditions or the like, turn buckles 173 are employed as shown at Figure 5, Sheet 4.

The device installed as shown at Figure 38 (Sheet 10) is intended more particularly for the protection of banks, store rooms or the like, which are unoccupied a considerable portion of the time and intended to give warning to the police or other persons upon the exterior of the building. It comprises a plurality of detonating units only, as shown, mounted vertically upon braces 174 and provided with triggers 175 in the path of movement of the weight 107 sliding in the guideways 176. Tubes or barrels 177 are provided connected directly with the detonating cartridge and extending outwardly through the side of the building represented at 178, so that the detonations may not only be heard upon the exterior of the building but the smoke resulting from such detonations may be seen, or when desired the barrels may be aimed to cover a given location and ball cartridges employed. The weight 107, as has been heretofore described, is connected with one of the alarm units, preferably in this case containing only the bell structure, the bell structure and detonating structure being separated physically in this case but operating in conjunction. When the arms 112 have been released by the pin 113 on the bail 77 in the usual manner, the weight 107 through the medium of the cable 104 will cause the shaft 103 to rotate to sound the bell in the usual manner as hereinbefore described. The descent of the weight 107 will periodically engage each of the several triggers 175, causing separate, distinct and spaced detonations. As shown in the drawings, three of these detonating devices have been connected to operate in conjunction with the bell ringing unit, but it is to be understood that a greater or less number of such detonating devices may be similarly employed and operated by the descent of the weight 107.

Figure 36:
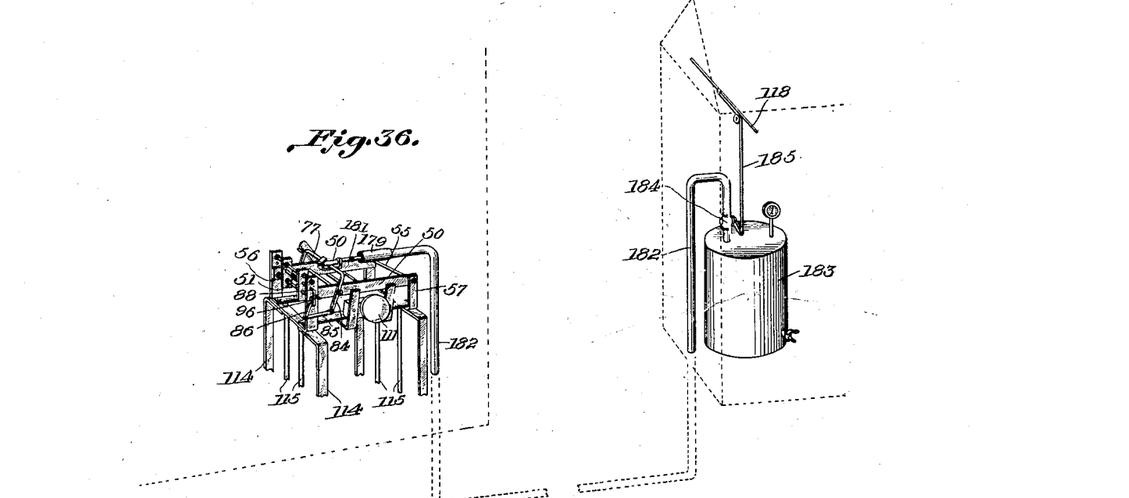
Fig. 36 is a perspective view of a unit and operating means wherein the unit is operated by compressed air.

In cases where it is found desirable or necessary to further protect the connection with an outbuilding to overcome craftiness of burglars, a pneumatic device is employed. This comprises a cylinder 179 (see Figures 36 and 37, Sheet 10) having a piston 180 mounted therein, connected with a piston rod 181 which in turn is connected with one of the plungers, designated as 50, but intended to include any plunger employed upon the device be the same more or less. It is connected directly with the bail 77 in the usual manner. From this cylinder 179, a tube or pipe 182 extends, preferably under ground, as indicated in dotted lines, and is connected with a storage tank 183 in which is stored compressed air. Air is admitted through the pipe 182 to the cylinder 179 by means of a valve 184 controlled by a cable 185 which in turn is controlled by the cable 118 extending about the building. The tensioning of the cable 185 serves to open the valve 184, permitting the passage of compressed air from the tank 183 to the cylinder 179 to operate the device.

Figure 34:
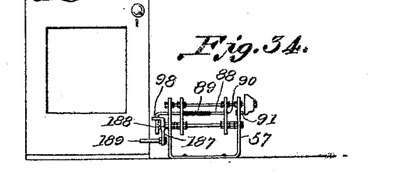
Fig. 34 (Sheet 6) is a view in elevation of an alarm unit attached to the floor adjacent to and operated directly from a door.

There has been shown at Figure 7, Sheet 5, a unit comprising the detonating section only secured to the wall adjacent the door 132. The connection with the door is or may be the same as hereinbefore described in which case, however, instead of employing the lever 121 as shown, the said lever is provided with a finger 186 which engages directly upon the detent 96 of the firing pin 88. Substantially a like structure is shown at Figure 34 (Sheet 6) wherein a lever 187 is pivoted at 188 and is provided with a pin 189 extending over the path of the door operating the firing pin in the manner described.

Figures 19, 20, 21, 25:
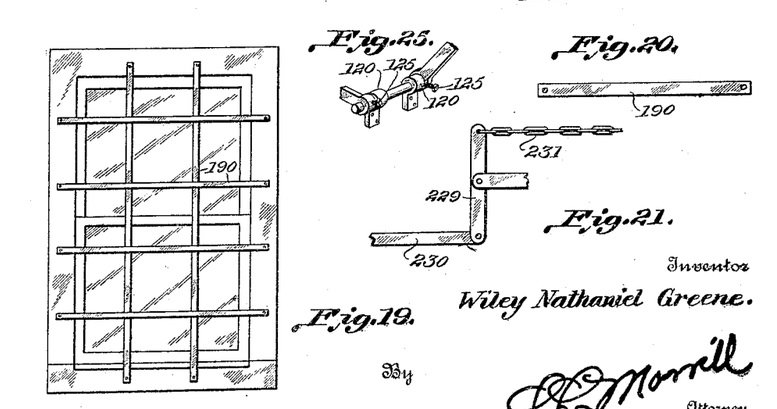
Fig. 19 is a view of a barred structure covering a window, it being understood that the sashes of the window are to be connected with the burglar alarm in the manner indicated.
Fig. 20 is a view in elevation of one of the bars shown at Fig. 19.
Fig. 21 is a view in elevation of a means for reversing the action of the actuating means translating the movement from a push to a pull.
Fig. 25 is a perspective view of the connecting shaft showing the levers attached thereto by set screws to provide for necessary or desirable adjustments.

As a further precautionary measure, the windows which are intended to be provided with the alarm may be covered with bars of substantially the usual and ordinary type, as shown at 190 at Figure 19 (Sheet 7). The showing of this device in this figure without the attaching means is merely for clearness of illustration, the bars being upon the exterior, if desired, the connecting means, therefore, being upon the opposite side and not visible.

As a further guard to the window already or not protected by the connection as shown at Figure 8 (Sheet 5), a grid of proper construction, indicated as an entirety at 191, Figure 18 (Sheet 7) is mounted to cover the window. Preferably, this will be mounted upon rollers 192 traveling upon a track 193 and will be provided with means for engaging the finger 189 of the device corresponding to the type shown at Figure 34 (Sheet 6) so that, when the shaft 119 to which this is connected is operated by the swinging of the grid 191, the cable 194 will be placed under tension to unlatch the latch 158. To prevent the sliding of the grid instead of swinging action, a hook 195 is carried by said grid engaging a pin or like structure 196.

This grid may be otherwise employed than as shown at Figure 18, as for instance as shown at Figure 31. In this case the hook is omitted and a cable 197 passes over a pulley 198 so that, in case the grid is moved upon the track 193, the cable is put under tension to exert stress upon the cable 118. As a further precaution, the grid is provided outside of the lines of the window with a heavy bar 199 upon which are pivoted a plurality of bell crank levers 200, 201 and 202. These are respectively controlled by springs 203, 204 and 205 and are connected by cables 206, 207 and 208 with the cable 197, a ring 209 forming a connection. The springs are maintained under tension and inoperative by means of wires 210 and 211 which extend transversely across the grid or, preferably, by means of a heavy bar 212. This bar is employed in some instances as when manipulated by skilled burglar, the wires 210 or 211 might be held against release in some manner, but a heavy bar such as shown at 212 must of necessity release its bell crank lever when severed.

As shown at Figure 26 (Sheet 8), the bars of the grid are, or at least may be, omitted and only wires such as 213, 214 and 215 extend across the frame. In the particular installation shown, the detonating device is local, operated directly by springs 216, 217 and 218 controlling the detonating units 219, 220 and 221. The severance of any one of the wires will, therefore, cause its individual and separate detonation. In this particular embodiment, the rollers 192 are mounted in forks 222 so that the frame carrying the device may be removed from the track when desired by withdrawing the journal pins 223 and as easily replaced by first moving the frame upwardly to embrace the track 193 in the forks and then placing the rollers 192 in position and the journal pins 223 in place.

In some places and under some conditions, it is found inconvenient or undesirable to have the frame provided with the grid or the wires slide, and other means of disposing of the same during hours of occupancy are provided. In this case, the frame 224, as shown at Figure 35 (Sheet 9), is fulcrumed at its upper corners at 225 and a cord 226 passes over pulleys 227 as the mounting may make desirable and engaged upon a cleat 228 so that the frame may be drawn upwardly to or adjacent the ceiling. The device for producing the alarm as shown at this figure is only intended as showing an operative device and the same construction may be employed with the grid as shown at Figure 18, or the separate detonating elements as shown at Figure 26.

In some locations it is necessary to translate motion in one direction into motion in another direction. For that purpose a lever 229, as shown at Figure 21 (Sheet 7) is employed which may be at one end pushed by a bar 230, exerting tension at its other end on a chain or cable 231. This is not intended for any specific connection with any specific unit, but wherever in the installation and operation of the device such translation of motion is found necessary or desirable.

It is to be understood also that any of the various connections, operating means and the like which have been shown only in connection with certain other parts are not limited in their utility to such association but may be associated in any manner and with any of the several elements, units or parts which have been disclosed otherwise connected and associated.

Figure 27:
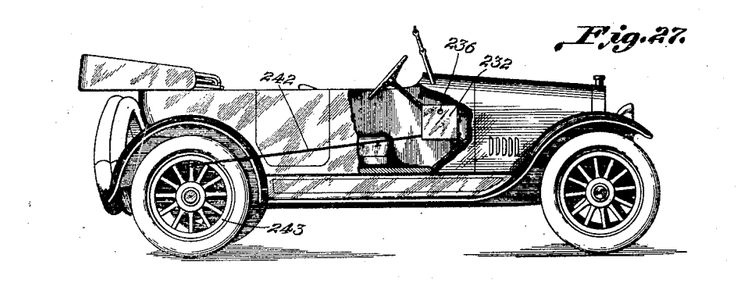
Fig. 27 is a view of the device mounted upon an automotive vehicle showing one manner of connecting to a moving part.
Figures 28, 39:
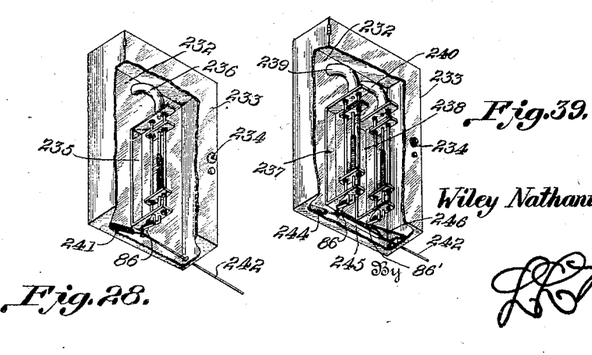
Fig. 28 is a view in perspective with the casing broken away of the detonating unit for automotive purposes.
Fig. 39 (Sheet 8) is a view of the vehicle alarm showing a plurality of detonating devices connected.

The device is also capable of employment as a protection for automotive vehicles. At Figure 27 (Sheet 8) a conventional motor vehicle is shown having located therein at any convenient point, as under the cowl, a housing 232. The housing is provided with a cover 233, as shown at Figures 28 and 39 on the same sheet, with locking means indicated conventionally at 234. Within the housing as shown at Figure 28 a single detonating unit 235 is employed having a barrel or pipe curved to discharge without the lines of the car at 236. As shown at Figure 39, two of these detonating units are mounted in the housing and shown respectively at 237 and 238 with separate, distinct discharges 239 and 240. In the single unit device, a spring 241 is employed with a cable 242 extending to some movable part of the machine as one of the rear wheels 243. In the double unit device, a similar spring 244 is employed with a similar cable 242 similarly connected. The cable in this case is connected within the housing to a link 245 which directly controls the trigger 86. For the second unit, a second trigger 86' is employed extending into the slot of said link, so that, when the cable 242 is released, the spring 244 first acts to discharge the unit 237 and the further movement of the link 245 acting upon the trigger 86' discharges the second detonating unit, forming two distinct detonations. A hook 246 serves to lock the device when not required for protecting purposes.

In case a greater number of rooms or closures are to be protected than can be conveniently mounted upon a single unit, units may be coupled together as shown at Figure 16 (Sheet 6), the bail in that case being connected rigidly with a shaft 247 and through the instrumentality of a coupling 248 with a similar bail shaft 249. The actuation, therefore, of any of the plungers, in this case five being shown in each unit, will actuate the bails of either of said units and, through the connection, release the detonating and bell ringing mechanism in the manner disclosed.

As shown at Figure 29, (Sheet 6) the rotating shaft is provided with a cable 250 which is wound thereon, extending to a lever 251 which in turn is adapted to actuate the bail of the second unit. The two units may be so proportioned that the detonation of the first element may take place some time before sufficient length of the cable 250 has been wound up to start the second unit. The starting of the second unit will produce a second detonation and the bells of the two units may be differently tuned to produce a different volume of sound or discordant sound as use may make desirable. Instead of coupling by the use of the auxiliary lever 251, the cables may extend to second and third units, as shown at 252 at Figure 17 on said sheet, the first unit winding the cable 252 and operating one of the regular levers to start and actuate the second unit which in turn winds the cable 252 to start and actuate the third unit. As many of these units may be thus coupled as may be desired.

It is believed that the operation of the several parts has been sufficiently described during the description of the construction of the units and elements to be thoroughly understood in their various connections, interactions and functions and that a further description would be superfluous.

What I claim to be new is:

1. In a burglar alarm the combination with movable protected parts, a frame, a bail mounted to swing upon said frame, a plurality of plungers co-acting with and independently capable of swinging the bail, levers for actuating said plungers, noise producing mechanisms released for action from the swinging of the bail, and connecting members extending from said levers independently to said protected elements.

2. A burglar alarm comprising a frame, a bail mounted to swing upon the frame, a spring-actuated cartridge firing pin mounted to slide upon the frame, means to restrain the firing pin from action, means actuated by the bail for releasing the firing pin from restraint, a plurality of plungers adapted to independently co-act with the bail to move said bail, annunciator members carried by said plungers, a plurality of levers, means connecting said levers and plungers in co-acting organizations, and members adapted to connect said levers independently with movable protected parts.

3. A burglar alarm comprising a frame, a bail mounted to swing upon the frame, a spring-actuated cartridge firing pin mounted to slide upon the frame, means to restrain the firing pin from action, a shaft journaled upon the frame, means tending to rotate the shaft, means actuated by the shaft for sounding an alarm, means for restraining the shaft from rotation, means actuated by the bail for releasing the firing pin and shaft when the bail is swung, a plurality of moving parts independently adapted to swing the bail, and members adapted to connect the moving parts independently with movable protected elements.

4. A burglar alarm comprising a frame, a bail mounted to swing upon the frame, a spring-actuated cartridge firing pin slidably mounted upon the frame, means to restrain the firing pin from action, a shaft journaled upon the frame, means tending to rotate the shaft, alarm sounding mechanism actuated by the rotation of the shaft, radially extending arms carried by the shaft, means interposed in the path of movement of the radial arms restraining said shaft from rotation, means whereby the swinging of the bail releases the firing pin and the shaft, a plurality of levers fulcrumed upon the frame, connecting means adapting said levers independently to swing the bail, and means adapted to connect said levers independently with movable protected parts.

5. A burglar alarm comprising a frame, a shaft journaled upon the frame, a cable wound upon said shaft, means exerting tension upon said cable tending to rotate said shaft, a bail mounted to swing upon said frame and provided with means for restraining the shaft from rotation, a plurality of plungers co-acting with the bail and adapted independently to move said bail out of restraining position, sounding means actuated by the rotation of the shaft and means adapted to connect said plungers independently with movable protected parts.

6. A burglar alarm comprising a frame, a shaft journaled upon the frame, means tending to rotate the shaft, a plurality of arms extending radially from the shaft, a bail mounted to swing upon the frame, a detent carried by the bail and normally interposed in the path of movement of the radial arms, a plurality of moving parts, each independently adapted to swing the bail to move the detent out of restraining position, sounding means actuated by the rotation of the shaft, and means adapted to connect the moving parts independently with movable protected elements.

7. A burglar alarm comprising a frame, a shaft journaled upon the frame, a cable wound upon the shaft, means exerting tension upon the cable tending to rotate the shaft, alarm mechanism operated by the rotation of the shaft, arms extending radially from the shaft, a bail mounted to swing upon the frame, a detent carried by the bail, disposed normally in the path of movement of the arms to restrain the shaft from rotation, a plurality of plungers independently movable relative to the bail and each adapted to independently actuate the bail to release the rotating arms, a plurality of levers fulcrumed upon the frame and connected with the plungers, and means adapted to connect the levers independently with movable protected elements.

8. A burglar alarm system comprising an alarm organization, a spring-actuated lever adapted to actuate said organization, a cable connected with said lever and extending to a protected element maintaining said lever inactive and under spring tension, an expansible member interposed in said cable, a latch normally maintaining said expansible member contracted, and means extending from said latch to a movable protected element to place said latch under the tension of the cable.

9. A burglar alarm system comprising an alarm organization, a spring-actuated lever adapted to actuate said organization, a cable connected with said lever and extending to a protected element and maintained under tension to restrain said lever from action, a severing mechanism mounted adjacent to said cable, and means connecting said severing member with a protected element whereby the movement of the protected element severs the cable and releases tension upon said lever.

10. A burglar alarm comprising a frame, a bail fulcrumed upon the frame, a noise producing mechanism released for action by the swinging of the bail, a plurality of bell crank levers fulcrumed upon the frame, plungers pivoted to one extremity of each of the bell crank levers and slidable relative to the bail, stops carried by the several plungers adapted to independently move the bail, and connecting members associated with the other extremities of said bell crank levers and adapted to be connected with a moving part of a protected member.

11. A burglar alarm comprising a frame, a bail fulcrumed to swing upon the frame, a noise producing mechanism carried by the frame, means actuated by the swinging of the bail for releasing the noise producing mechanism, a plurality of bell crank levers concentrically fulcrumed upon the frame, a plunger carried by each of said bell crank levers pivoted to one end thereof and slidable upon the bail, a yoke carried by the plunger embracing the bail to maintain the plunger in association therewith and form stops to limit the movement of the plunger relative to the bail, and connecting members associated with the ends of the bell crank levers opposite the plungers adapted to be connected with the moving part of a protected member.

12. A burglar alarm comprising a frame, a bail extending transversely across the frame and having downwardly turned extremities fulcrumed to the frame, noise producing mechanisms carried by the frame, means associated with the lower extended extremities of the down turned ends of the bail adapted to release the noise producing mechanisms when the bail is swung upon its fulcrum, a plurality of concentrically fulcrumed bell crank levers carried by the frame, each of said bell crank levers being provided with a plunger pivoted thereto and slidable upon the bail, yokes carried by the plungers embracing the bail and maintaining the plunger in association therewith, annunciator members carried by the plungers, and connecting members connecting with the ends of the bell crank levers opposite the pivoting of the plungers, and adapted for connecting with a moving part of a protected member.

13. A burglar alarm comprising a frame, a noise producing mechanism carried by the frame, a movable part adapted to release the noise producing mechanism, a cable extending about a protected structure, an expansible member inserted in the cable and comprising blades pivoted together at one end to which said cables are attached, a latch extending across between said blades and forming therewith an A-shaped member, a wire extending said latch to the movable part of a protected member, and a spring interposed between the releasing mechanism of the alarm unit and the cable, maintaining said cable under tension and tending to release said mechanism when the expansible member is unlatched.

14. A burglar alarm installation comprising an alarm unit having a movable part, a cable extending from said unit about a protected structure, a spring interposed in said cable tending to maintain said cable under tension and tending, when released, to actuate said alarm unit, a bracket forming a support for said cable, a knife pivoted to the bracket adapted to sever the cable when actuated, and a wire extending from said knife adapted for connecting with the moving part of a protected element.

In testimony whereof I affix my signature.

WILEY NATHANIEL GREENE.